US010728193B2

(12) United States Patent
Abuelsaad et al.

(10) Patent No.: US 10,728,193 B2
(45) Date of Patent: Jul. 28, 2020

(54) RECEIVING AND SHARING FILES IN A GROUP MESSAGING ENVIRONMENT

(71) Applicant: INTERNATIONAL BUSINESS MACHINES CORPORATION, Armonk, NY (US)

(72) Inventors: Tamer E. Abuelsaad, Armonk, NY (US); Muhammed Fatih Bulut, New York, NY (US); Tolga Oral, West Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 15/816,015

(22) Filed: Nov. 17, 2017

(65) Prior Publication Data

US 2019/0158440 A1    May 23, 2019

(51) Int. Cl.
*H04L 12/58* (2006.01)
*G06F 1/3212* (2019.01)
*H04W 4/80* (2018.01)

(52) U.S. Cl.
CPC ............ *H04L 51/08* (2013.01); *G06F 1/3212* (2013.01); *H04L 51/14* (2013.01); *H04L 51/20* (2013.01); *H04L 51/38* (2013.01); *H04W 4/80* (2018.02)

(58) Field of Classification Search
CPC ......... H04L 51/08; H04L 51/14; H04L 51/20; H04L 51/38; G06F 1/3212; H04W 4/80
USPC ....................................................... 709/206
See application file for complete search history.

(56) References Cited

U.S. PATENT DOCUMENTS

| 7,549,047 | B2 | 6/2009 | Balfanz et al. |
| 7,574,488 | B2 | 8/2009 | Matsubara |
| 7,620,404 | B2 | 11/2009 | Chesnais et al. |
| 8,316,098 | B2 | 11/2012 | Luna et al. |
| 8,989,670 | B2 | 3/2015 | Kiveisha et al. |
| 9,240,962 | B2 | 1/2016 | Jung |
| 9,380,434 | B2 | 6/2016 | Waisel et al. |

(Continued)

FOREIGN PATENT DOCUMENTS

GB        2391135 A    1/2004

OTHER PUBLICATIONS

"Location-Based Apps with IBM Cloudant—IBM Analytics" Geospatial Tutorial (3:20) Aug. 25, 2017. <https://www.ibm.com/analytics/us/en/technology/location-based-apps/>.

(Continued)

*Primary Examiner* — Nicholas R Taylor
*Assistant Examiner* — Chong G Kim
(74) *Attorney, Agent, or Firm* — Edward P. Li

(57) ABSTRACT

A method, a computer program product, and a computer system for receiving and sharing files in a group messaging environment. One or more servers in an infrastructure computing environment receive a file from a mobile device of a first user in a group of users in a session of group messaging. The one or more servers determine locations, battery levels, and data download speeds of mobile devices of the users. The one or more servers determine co-located users, based on the locations. The one or more servers select a second user from the co-located users, based on the battery levels and the data download speeds. The one or more servers send the file to a mobile device of the second user. The mobile device of the second user sends the file to mobile devices of the co-located users through a short-range communication medium.

15 Claims, 6 Drawing Sheets

(56) References Cited

U.S. PATENT DOCUMENTS

| | | |
|---|---|---|
| 2005/0239405 A1 | 10/2005 | Myyry et al. |
| 2008/0318610 A1* | 12/2008 | Bhaskaran ............ H04W 76/45 |
| | | 455/518 |
| 2010/0020745 A1* | 1/2010 | Agulnik ................ H04W 76/40 |
| | | 370/328 |
| 2010/0190478 A1* | 7/2010 | Brewer .................. H04W 4/10 |
| | | 455/414.1 |
| 2012/0129569 A1* | 5/2012 | Courtney ............... G08B 21/10 |
| | | 455/550.1 |
| 2012/0131076 A1 | 5/2012 | Chen et al. |
| 2012/0254116 A1* | 10/2012 | Thereska ............. H04L 63/205 |
| | | 707/640 |
| 2013/0059606 A1* | 3/2013 | Pujol .................... H04W 4/023 |
| | | 455/456.3 |
| 2014/0012921 A1* | 1/2014 | Otomo ................... H04L 67/04 |
| | | 709/204 |
| 2014/0201280 A1* | 7/2014 | Qi .......................... H04W 4/70 |
| | | 709/204 |
| 2015/0213081 A1 | 7/2015 | Singhal |
| 2016/0105291 A1* | 4/2016 | Anchan ................ H04L 12/189 |
| 2017/0277424 A1* | 9/2017 | Witkowski .......... G06F 3/04883 |
| 2017/0359412 A1* | 12/2017 | Haebler ................. H04L 67/06 |
| 2018/0124128 A1* | 5/2018 | Faulkner ................ H04L 67/18 |

OTHER PUBLICATIONS

Shewale et al. "Mobile Messaging using Wi-Fi Adhoc Network" International Journal of Innovative Research in Computer and Communication Engineering. vol. 1, Issue 1, Mar. 2013. pp. 44-47.
Mell et al. "The NIST Definition of Cloud Computing Recommendations of the National Institute of Standards and Technology". Special Publication 800-145. National Institute of Standards and Technology Gaithersburg, MD. Sep. 2011. Seven pages.

* cited by examiner

RECEIVING AND SHARING FILES IN A GROUP MESSAGING ENVIRONMENT

BACKGROUND

The present invention relates generally to a group messaging environment, and more particularly to receiving and sharing files in a group messaging environment.

As a result of increasing use of smartphones and messaging applications, such as WhatsApp®, Viber®, iMessage®, and others have gone viral. Nowadays, smartphones and messaging applications are all integral part of people's lives, and people use smartphones and messaging applications to communicate with friends and families. Specifically, the "group messaging" feature of smartphones and messaging applications enable people to communicate with multiple people at the same time. However, a problem with group messaging is that the content of a message, which is usually text, image, or video, is downloaded to each person's device individually over the Internet via Wi-Fi™ or a cellular network (3G/4G/LTE) without taking co-location into account.

SUMMARY

In one aspect, a method for receiving and sharing files in a group messaging environment is provided. The method includes receiving, by one or more servers in an infrastructure computing environment, a file from a mobile device of a first user in a group of users in a session of group messaging. The method further includes determining, by the one or more servers, locations, battery levels, and data download speeds of mobile devices of the users. The method further includes determining, by the one or more servers, co-located users, based on the locations. The method further includes selecting, by the one or more servers, a second user from the co-located users, based on the battery levels and the data download speeds. The method further includes sending, by the one or more servers, the file to a mobile device of the second user. The mobile device of the second user sends the file to mobile devices of the co-located users through a short-range communication medium.

In another aspect, a computer program product for receiving and sharing files in a group messaging environment is provided. The computer program product comprises a computer readable storage medium having program code embodied therewith. The program code is executable to: receive, by one or more servers in an infrastructure computing environment, a file from a mobile device of a first user in a group of users in a session of group messaging; determine, by the one or more servers, locations, battery levels, and data download speeds of mobile devices of the users; determine, by the one or more servers, co-located users, based on the locations; select, by the one or more servers, a second user from the co-located users, based on the battery levels and the data download speeds; send, by the one or more servers, the file to a mobile device of the second user; and wherein the mobile device of the second user sends the file to mobile devices of the co-located users through a short-range communication medium.

In yet another aspect, a computer system for receiving and sharing files in a group messaging environment is provided. The computer system comprises one or more processors, one or more computer readable tangible storage devices, and program instructions stored on at least one of the one or more computer readable tangible storage devices for execution by at least one of the one or more processors. The program instructions are executable to receive, by one or more servers in an infrastructure computing environment, a file from a mobile device of a first user in a group of users in a session of group messaging. The program instructions are further executable to determine, by the one or more servers, locations, battery levels, and data download speeds of mobile devices of the users. The program instructions are further executable to determine, by the one or more servers, co-located users, based on the locations. The program instructions are further executable to select, by the one or more servers, a second user from the co-located users, based on the battery levels and the data download speeds. The program instructions are further executable to send, by the one or more servers, the file to a mobile device of the second user. The mobile device of the second user sends the file to mobile devices of the co-located users through a short-range communication medium.

DETAILED DESCRIPTION

Figure 1:
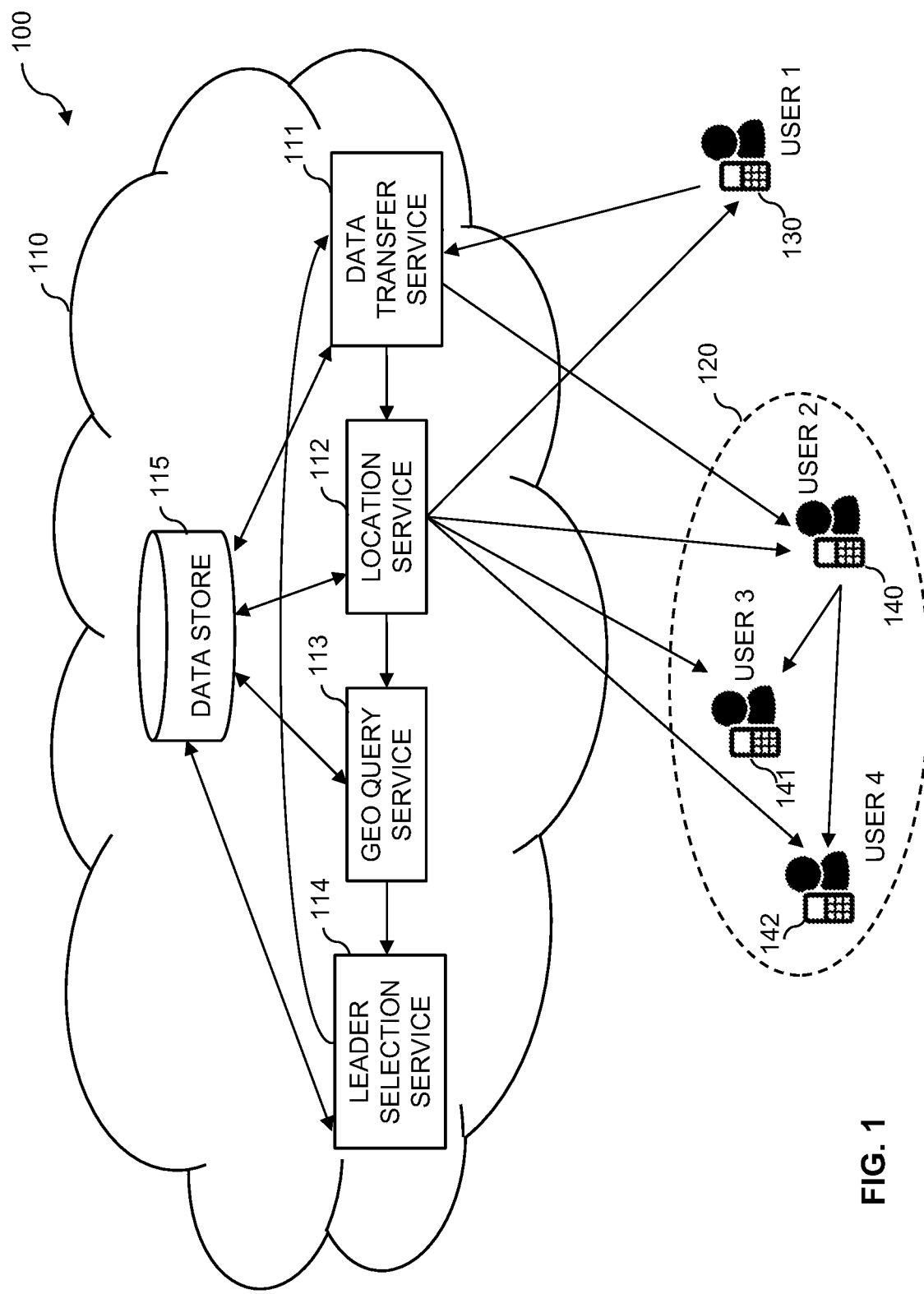
FIG. 1 is a diagram illustrating a system for receiving and sharing files in a group messaging environment, in accordance with one embodiment of the present invention.

Embodiments of the present invention disclose a method and system for receiving and sharing files in a group messaging environment. The method and system determine co-located users in a messaging group; the co-located users of mobile devices are those messaging group members who are nearby. The method and system enable one of the co-located users to download content of a message, which is usually text, image, or video, to share content of a message with other group members via wireless technologies such as Bluetooth®.

Embodiments of the present invention save data usage cost as only one of the co-located users downloads the content of the message through the Internet. Embodiments of the present invention also save batteries of mobile devices by not downloading the content of the message from the Internet for each of the co-located users.

In embodiments of the present invention, to be fair among the co-located users, a leader of the co-located users is to be selected based on turns, so that downloading from the Internet is done in turns and every co-located users use data plans equally.

Embodiments of the present invention also help an application backend reduce its load as a result of providing the content to a mobile device of one of the co-located users as opposed to providing to a mobile device of each of the co-located users separately.

The present invention is relevant but at the same time different from the peer-to-peer (P2P) file sharing in the following aspects. (1) From the architecture perspective, the system of the present invention is different from the P2P file sharing system. In P2P file sharing, a file is downloaded from multiple devices where each device provides only the parts of the file. Every participant in the P2P file sharing system has the same privilege. However, in the present invention, a file is downloaded directly from the server via a user's mobile device and shared with others from this user. A user with the high battery level and data download speed are preferred in the present invention. (2) The P2P file sharing depends on complex networking protocols and therefore is hard to apply in current messaging applications. However, the method and system in the present invention can easily be developed using the existing protocols. (3) Determining the co-located user in the present invention is based on high accuracy GPS or network location services available in today's mobile devices such as smartphones. However, in the P2P file sharing, location concept is based on IP addresses.

Embodiments of the present invention disclose a method and system for reducing the cost associated with cellular data usage along with improving battery expenditure of the group messaging application. Using the group messaging application, members of the messaging group are able to configure preferences of receiving and sending files from/to the co-located member in the messaging group. Whenever a message is sent to the group, locations of the users are probed and learned. Co-located users of the messaging group are identified. A leader among the co-located users is identified based on the battery level, data download speed, fairness, and preferences. In one embodiment, images and videos is only sent to the leader, and text is sent directly to each user. In another embodiment, a size of the content of the message can be defined as a predetermined threshold; the predetermined threshold is used to determine whether the content of the message is only sent to the leader or is sent directly to each user. If the size of the content of the message is below the predetermined threshold, the content of the message will be sent to each user directly; if the size of the content of the message above the predetermined threshold, the content of the message will be sent to the leader. Then, the leader forwards message to the co-located users via wireless technologies, such as Bluetooth®, Wi-Fi Direct® or other available short-range communication medium. As a result, only the leader, who has enough battery and faster data download speed, has to download the file from the server and therefore enabling to reduce the cellular data usage and battery expenditure for other co-located members of the messaging group, as well as reducing the load on the application server.

FIG. 1 is a diagram illustrating a system 100 for receiving and sharing files in a group messaging environment, in accordance with one embodiment of the present invention. The system 100 includes an infrastructure computing environment or cloud computing environment 110. The infrastructure computing environment or cloud computing environment 110 includes a data transfer service 111, a location service 112, a geo query service 113, a leader selection service 114, and a data store 115. The data transfer service 111, the location service 112, the geo query service 113, the leader selection service 114, and the data store 115 are provided by one or more servers in the infrastructure computing environment or cloud computing environment 110. In one embodiment, the one or more servers reside on one or more physical machines in the infrastructure computing environment or cloud computing environment 110. The physical machines are computing devices which are described in more detail in later paragraphs with reference to FIG. 4. In another embodiment, the one or more servers reside on one or more virtual machines or other virtualization implementations. The virtual machine or the virtualization implementation runs on one or more physical machines in the infrastructure computing environment or cloud computing environment 110.

Referring to FIG. 1, the system 100 further includes respective mobile devices used by a plurality of users in a messaging group. The mobile devices are mobile computing devices such as smartphones. The mobile computing devices are described in more detail in later paragraphs with reference to FIG. 4. For example, for the illustrative purpose, the system 100 includes a mobile device 130 used by user 1, a mobile device 140 used by user 2, a mobile device 141 used by user 3, and a mobile device 142 used by user 4. Users 1-4 are in the same messaging group; among users 1-4, users 2-4 are in a group 120 of co-located users.

Referring to FIG. 1, the data transfer service 111 receives a message sent from the mobile device 130 used by user 1. The content of the message may be text, image, and/or video. The location service 112 is configured to determine locations, battery levels, and data download speed of the mobile devices used by the users in the messaging group. Information of locations, battery levels, and data download speeds may be retrieved by the location service 112 from the data store 115. The locations may be determined by Global Positioning System (GPS) or network locations. The geo query service 113 is configured to determine which ones of the users in the messaging group are the co-located users. For example, IBM® Cloudant® Geo may be used for fast and accurate geo queries.

Referring to FIG. 1, the leader selection service 114 is configured to determine a leader whose mobile device receives and shares the content of message with mobile devices of the co-located users. For example, shown in FIG. 1, user 2 is the selected leader; the mobile device 140 used by user 2 receives the content of the message from the data transfer service 111 and shares the content with the mobile device 141 used by user 3 and the mobile device 142 used by user 4 in the group 120 of the co-located users. The leader selection service 114 selects the leader based on the battery levels, data download speeds, and turns. The one whose mobile device has higher battery level and data download speed is prioritized to other users in the co-located group.

Referring to FIG. 1, once the leader selection service 114 determines that the user 2 is the leader in the group 120 of the co-located users, the data transfer service 111 sends the content of the massage to the mobile device 140 used by user 2 (the leader). The mobile device 140 used by user 2 (the leader) shares the content of the massage with mobile devices (the mobile devices 141 and 142) respectively used by other co-located users (user 3 and user 4) in the group 120 of the co-located users, by using short-range communication medium such as Bluetooth® and Wi-Fi Direct®.

Referring to FIG. 1, the data store 115 is a database storing data retrieved and stored by the data transfer service 111, the location service 112, the geo query service 113, and the leader selection service 114. The data retrieved and stored by the services includes the content of the massage (such as text, image, and/or video). The data retrieved and stored by the services further includes information of locations, battery levels, and data download speed of the mobile devices used by the users in the messaging group. The data retrieved and stored by the services further includes different configurations of the user's preference for sending and receiving the content of the message.

Figure 2:
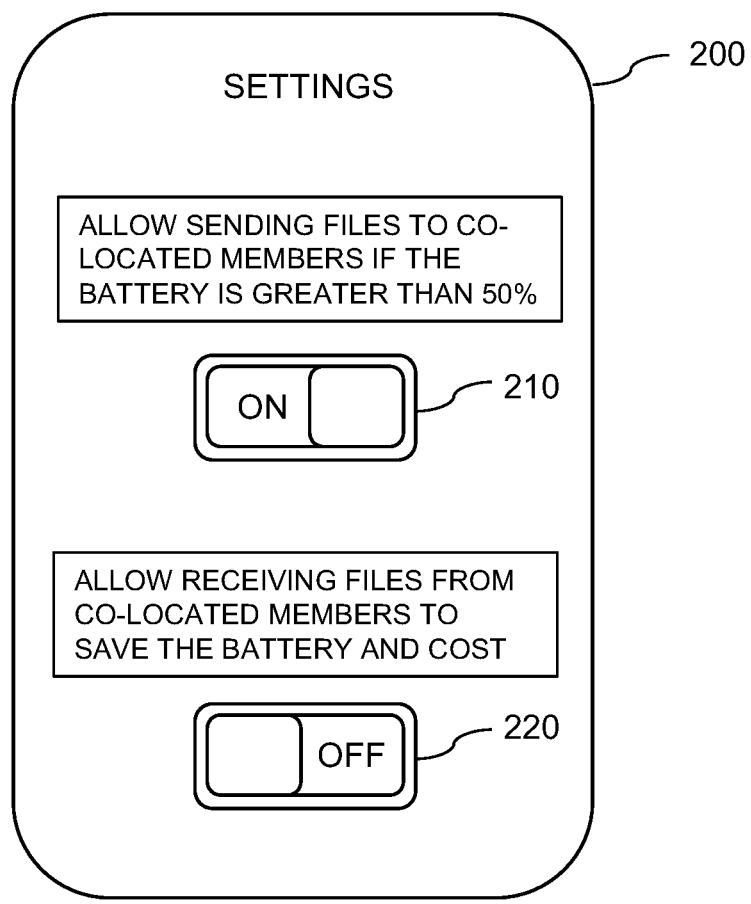
FIG. 2 is a diagram illustrating an example of settings of a group messaging application on a mobile device used by a user, in accordance with one embodiment of the present invention.

FIG. 2 is a diagram illustrating an example of settings 200 of a group messaging application on a mobile device used by a user, in accordance with one embodiment of the present invention. The group messaging application on the mobile device used by the user can be configured based on the user's preference which is the user's willingness to send the content of the massage to other users in the co-located group and the user's willingness to receive from the other users. For example, shown in FIG. 2, a sending setting 210 of the user is ON; the user's preference for sending the content of the massage to the other users is: allow sending files to co-located members if the battery is greater than 50%. In the same example, a receiving setting 220 of the user is OFF; if the receiving setting 220 is ON the user's preference for receiving the content of the massage from the other users is: allow receiving files from co-located members to save the battery and cost. For different configurations of the user's preference, four possible actions that can be taken by the group messaging application are listed in Table 1. Co-located group members who set preferences of the sending settings to ON are potential leaders to be selected by the leader selection service 114.

TABLE 1

Different Configurations of the User's Preference

| Sending | Receiving | Action |
| --- | --- | --- |
| On | On | Receive the content of the message from a server if selected as a leader; otherwise, receive from a co-located member |
| On | Off | Receive the content of the message only from a server, and send to others if selected as a leader |
| Off | On | Receive the content of the message from a co-located member if possible, but do not send to others |
| Off | Off | Receive the content of the message directly from a server, and do not send to others |

Figure 3:
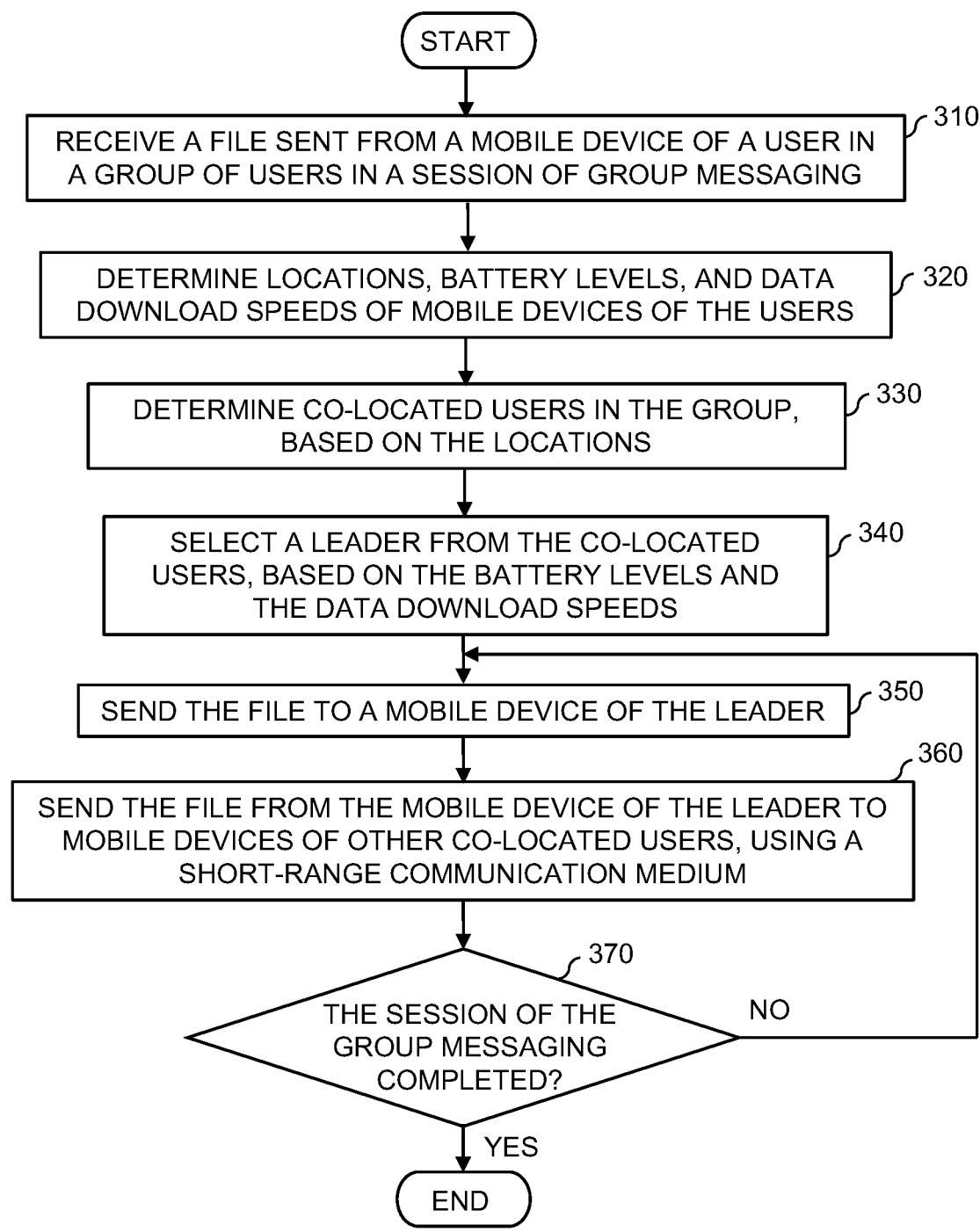
FIG. 3 is a flowchart showing operational steps for receiving and sharing files in a group messaging environment, in accordance with one embodiment of the present invention.

FIG. 3 is a flowchart showing operational steps for receiving and sharing files in a group messaging environment, in accordance with one embodiment of the present invention. The steps are implemented by one or more servers in the infrastructure computing environment or cloud computing environment 110 shown in FIG. 1. At step 301, the one or more servers receive a file sent from a mobile device by a user in a group of users in a session of group messaging. The file is the content of the message and, for example, it may be text, image, or video. In one embodiment, as shown in FIG. 1, the data transfer service 111 receives the file sent from the mobile device 130 by a user 1.

At step 320, the one or more servers determine locations, battery levels, and download speeds of mobile devices of the users in the session of group messaging. For example, as shown in FIG. 1, the location service 112 determines the locations, the battery levels, and the download speeds of mobile devices 130, 140, 141, and 142 used by users 1-4, respectively. The location service 112 may retrieve information of the locations, the battery levels, and the data download speeds from the data store 115 (shown in FIG. 1).

At step 330, the one or more servers determine co-located users in the group, based on the locations. For example, as shown in FIG. 1, the geo query service 113 determines which ones of the users in the messaging group are the co-located users; the geo query service 113 determines that users 2-4 are the co-located users in the group 120 of co-located users.

At step 340, the one or more servers select a leader from the co-located users, based on the battery levels, and the data download speeds. For example, as shown in FIG. 1, the leader selection service 114 selects user 2 in the group 120 of co-located users as the leader. The leader selection service 114 may selected based on turns; therefore, every co-located users use data plans equally.

At step 350, the one or more servers send the file to a mobile device of the leader. For example, as shown in FIG. 1, the data transfer service 111 sends the file to the mobile device 140 used by user 2 (the leader).

At step 360, the device of the leader sends the file to mobile devices of the co-located users, using a short-range communication medium. For example, the short-range communication medium may be Bluetooth® or Wi-Fi Direct®. For example, as shown in FIG. 1, the mobile device 140 used by user 2 (the leader) sends the file to mobile devices 141 used by user 3 and 142 used by user 4 in the group 120 of co-located users.

At step 370, the one or more servers determine whether the session of the group messaging is completed. In response to determining that the session of the group messaging is completed (YES branch of block 370), the one or more servers terminate the steps. In response to determining that the session of the group messaging is not completed (NO branch of block 370), the one or more servers reiterate step 350.

Figure 4:
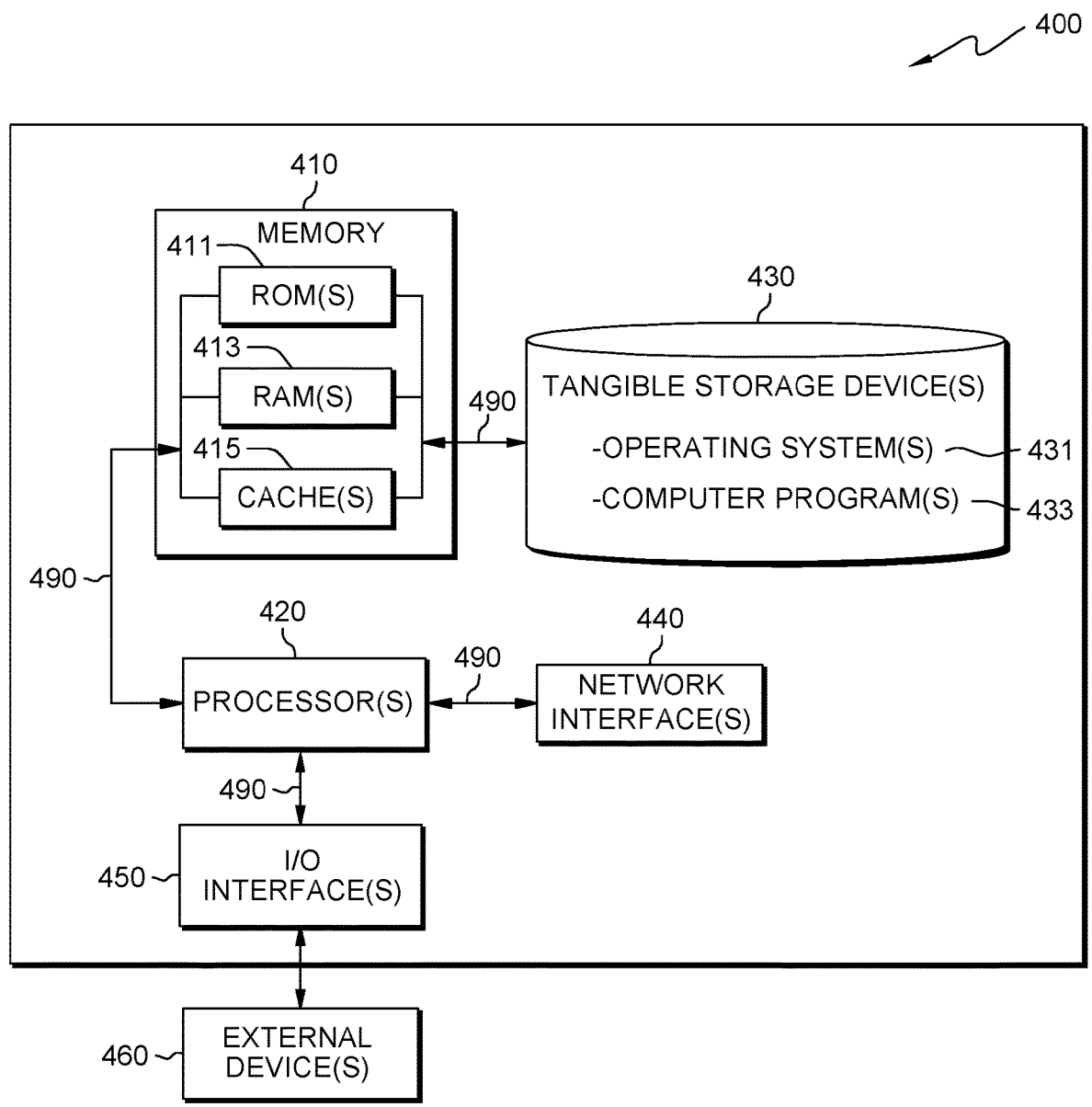
FIG. 4 is a diagram illustrating components of a computing device, in accordance with one embodiment of the present invention.

FIG. 4 is a diagram illustrating components of computing device 400, in accordance with one embodiment of the present invention. It should be appreciated that FIG. 4 provides only an illustration of one implementation and does not imply any limitations with regard to the environment in which different embodiments may be implemented.

Referring to FIG. 4, computing device 400 includes processor(s) 420, memory 410, and tangible storage device(s) 430. In FIG. 4, communications among the above-mentioned components of computing device 400 are denoted by numeral 490. Memory 410 includes ROM(s) (Read Only Memory) 411, RAM(s) (Random Access Memory) 413, and cache(s) 415. One or more operating systems 431 and one or more computer programs 433 reside on one or more computer readable tangible storage device(s) 340.

Computing device 400 further includes I/O interface(s) 450. I/O interface(s) 450 allows for input and output of data with external device(s) 460 that may be connected to computing device 400. Computing device 400 further includes network interface(s) 440 for communications between computing device 400 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
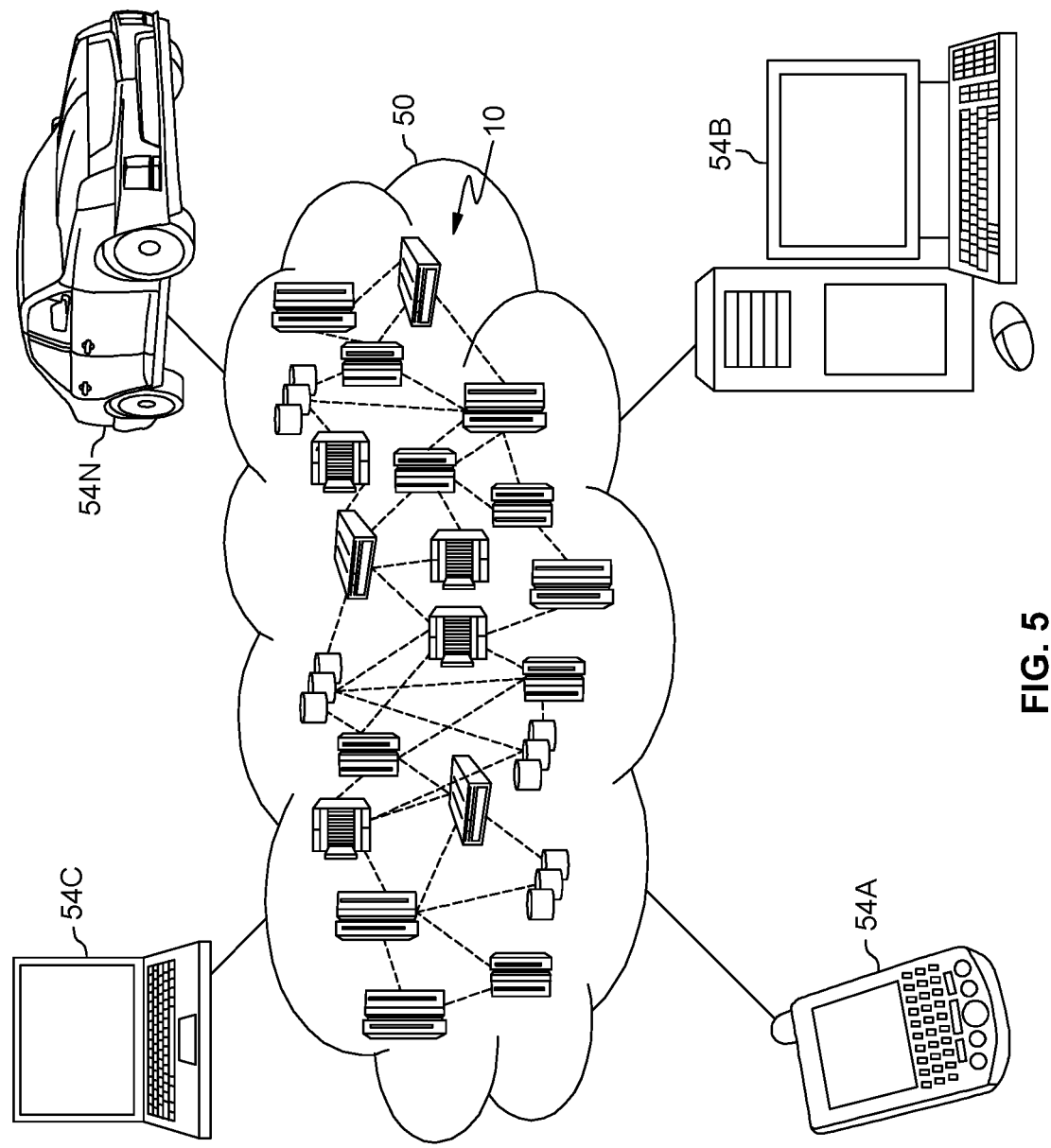
FIG. 5 depicts a cloud infrastructure environment, in accordance with one embodiment of the present invention.

FIG. 5 depicts cloud infrastructure environment 50, in accordance with one embodiment of the present invention. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
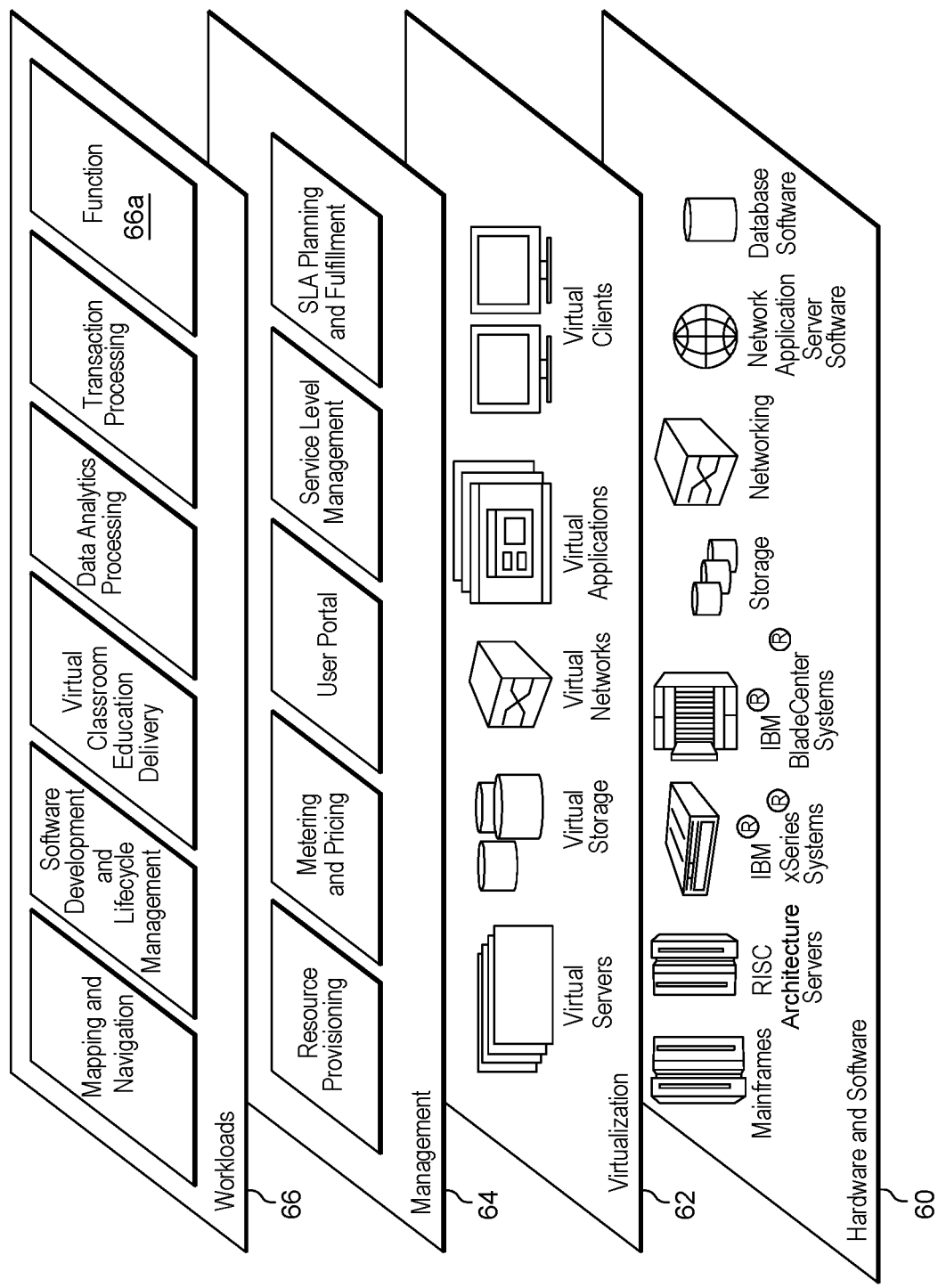
FIG. 6 depicts abstraction model layers in a cloud infrastructure environment, in accordance with one embodiment of the present invention.

Referring now to FIG. 6, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes, RISC (Reduced Instruction Set Computer) architecture based servers, servers, blade servers, storage devices, and networks and networking components. In some embodiments, software components include network application server software and database software.

Virtualization layer 62 provides an abstraction layer from which the following examples of virtual entities may be provided: virtual servers, virtual storage, virtual networks, including virtual private networks, virtual applications and operating systems, and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User Portal provides access to the cloud computing environment for consumers and system administrators. Service Level Management provides cloud computing resource allocation and management such that required service levels are met. Service Level Agreement (SLA) Planning and Fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: Mapping and Navigation, Software Development and Lifecycle Management, Virtual Classroom Education Delivery, Data Analytics Processing, Transaction Processing, and functionality according to the present invention (Function 66a). Function 66a in the present invention is the functionality of the data transfer service 111, the location service 112, the geo query service 113, the leader selection service 114 in the infrastructure computing environment or cloud computing environment 110 shown in FIG. 1.

What is claimed is:

1. A method for receiving and sharing files in a group messaging environment, the method comprising:
   receiving, by one or more servers in an infrastructure computing environment, a file from a mobile device of a first user in a group of users in a session of group messaging;
   determining, by the one or more servers, whether a size of the file is greater than a predetermined threshold;
   in response to determining that the size of the file is greater than the predetermined threshold, determining, by the one or more servers, that the file is to be sent from a mobile device of a second user through a short-range communication medium to mobile devices of co-located users in the session of the group messaging, wherein the second user is one of the co-located users;
   determining, by the one or more servers, locations, battery levels, and data download speeds of mobile devices of the users in the session of the group messaging;
   determining, by the one or more servers, the co-located users, based on the locations;
   selecting, by the one or more servers, the second user from the co-located users, based on the battery levels and the data download speeds;
   sending, by the one or more servers, the file to the mobile device of the second user, wherein the mobile device of the second user sends the file to the mobile devices of the co-located users through the short-range communication medium; and
   in response to determining that the size of the file is below the predetermined threshold, sending, by the one or more servers, the file directly from the one or more servers to each of the mobile devices of the users in the session of the group messaging.

2. The method of claim 1, further comprising:
   retrieving, by the one or more servers, information of the locations, the battery levels, and the data download speeds from a data store in the infrastructure computing environment.

3. The method of claim 1, further comprising:
   selecting, by the one or more servers, the second user from the co-located users, based on turns.

4. The method of claim 1, further comprising:
   determining, by the one or more servers, whether the file is a text file, an image file, or a video file;
   in response to determining that the file is the image file or the video file, determining, by the one or more servers, that the image file or the video file is to be sent from the mobile device of the second user through the short-range communication medium to the mobile devices of the co-located users;
   sending, by the one or more servers, the image file or the video file to the mobile device of the second user; and
   wherein the mobile device of the second user sends the image file or the video file to the mobile devices of the co-located users through the short-range communication medium.

5. The method of claim 4, further comprising:
   sending, by the one or more servers, the text file directly from the one or more servers to the mobile devices of the users in the session of the group messaging, in response to determining that the file is the text file.

6. A computer program product for receiving and sharing files in a group messaging environment, the computer program product comprising a computer readable storage medium having program code embodied therewith, the program code executable to:
   receive, by one or more servers in an infrastructure computing environment, a file from a mobile device of a first user in a group of users in a session of group messaging;
   determine, by the one or more servers, whether a size of the file is greater than a predetermined threshold;
   in response to determining that the size of the file is greater than the predetermined threshold, determine, by the one or more servers, that the file is to be sent from a mobile device of a second user through a short-range communication medium to mobile devices of co-located users in the session of the group messaging, wherein the second user is one of the co-located users;
   determine, by the one or more servers, locations, battery levels, and data download speeds of mobile devices of the users in the session of the group messaging;
   determine, by the one or more servers, the co-located users, based on the locations;
   select, by the one or more servers, the second user from the co-located users, based on the battery levels and the data download speeds;
   send, by the one or more servers, the file to a mobile device of the second user, wherein the mobile device of the second user sends the file to the mobile devices of the co-located users through the short-range communication medium; and
   in response to determining that the size of the file is below the predetermined threshold, send, by the one or more servers, the file directly from the one or more servers to each of the mobile devices of the users in the session of the group messaging.

7. The computer program product of claim 6, further comprising the program code executable to:
   retrieve, by the one or more servers, information of the locations, the battery levels, and the data download speeds from a data store in the infrastructure computing environment.

8. The computer program product of claim 6, further comprising the program code executable to:
   select, by the one or more servers, the second user from the co-located users, based on turns.

9. The computer program product of claim 6, further comprising the program code executable to:
   determine, by the one or more servers, whether the file is a text file, an image file, or a video file;
   in response to determining that the file is the image file or the video file, determine, by the one or more servers, that the image file or the video file is to be sent from the mobile device of the second user through the short-range communication medium to the mobile devices of the co-located users;

send, by the one or more servers, the image file or the video file to the mobile device of the second user; and wherein the mobile device of the second user sends the image file or the video file to the mobile devices of the co-located users through the short-range communication medium.

10. The computer program product of claim 9, further comprising the program code executable to:

send, by the one or more servers, the text file directly from the one or more servers to each of the mobile devices of the users, in response to determining that the file is the text file.

11. A computer system for receiving and sharing files in a group messaging environment, the computer system comprising:

one or more processors, one or more computer readable tangible storage devices, and program instructions stored on at least one of the one or more computer readable tangible storage devices for execution by at least one of the one or more processors, the program instructions executable to:

receive, by one or more servers in an infrastructure computing environment, a file from a mobile device of a first user in a group of users in a session of group messaging;

determine, by the one or more servers, whether a size of the file is greater than a predetermined threshold;

in response to determining that the size of the file is greater than the predetermined threshold, determine, by the one or more servers, that the file is to be sent from a mobile device of a second user through a short-range communication medium to mobile devices of co-located users in the session of the group messaging, wherein the second user is one of the co-located users;

determine, by the one or more servers, locations, battery levels, and data download speeds of mobile devices of the users in the session of the group messaging;

determine, by the one or more servers, the co-located users, based on the locations;

select, by the one or more servers, the second user from the co-located users, based on the battery levels and the data download speeds;

send, by the one or more servers, the file to a mobile device of the second user, wherein the mobile device of the second user sends the file to the mobile devices of the co-located users through the short-range communication medium; and in response to determining that the size of the file is below the predetermined threshold, send, by the one or more servers, the file directly from the one or more servers to each of the mobile devices of the users in the session of the group messaging.

12. The computer system of claim 11, further comprising the program instructions executable to:

retrieve, by the one or more servers, information of the locations, the battery levels, and the data download speeds from a data store in the infrastructure computing environment.

13. The computer system of claim 11, further comprising the program instructions executable to:

select, by the one or more servers, the second user from the co-located users, based on turns.

14. The computer system of claim 11, further comprising the program instructions executable to:

determine, by the one or more servers, whether the file is a text file, an image file, or a video file;

in response to determining that the file is the image file or the video file, determine, by the one or more servers, that the image file or the video file is to be sent from the mobile device of the second user through the short-range communication medium to the mobile devices of the co-located users;

send, by the one or more servers, the image file or the video file to the mobile device of the second user; and wherein the mobile device of the second user sends the image file or the video file to the mobile devices of the co-located users through the short-range communication medium.

15. The computer system of claim 14, further comprising the program instructions executable to:

send, by the one or more servers, the text file directly from the one or more servers to each of the mobile devices of the users, in response to determining that the file is the text file.

* * * * *